March 24, 1970  J. A. HOLLY  3,502,979
QUIET INTERVAL PULSE SAMPLING
Filed April 26, 1967
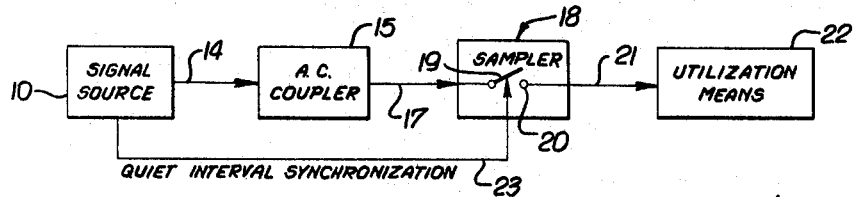
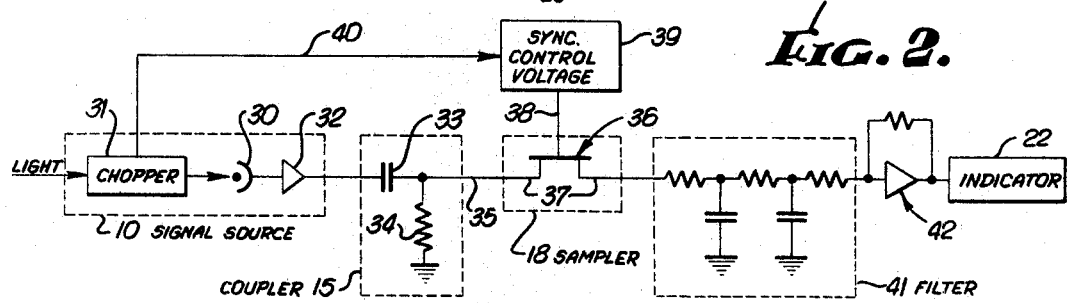
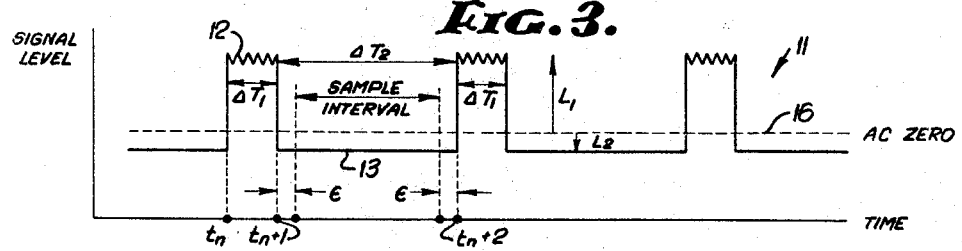
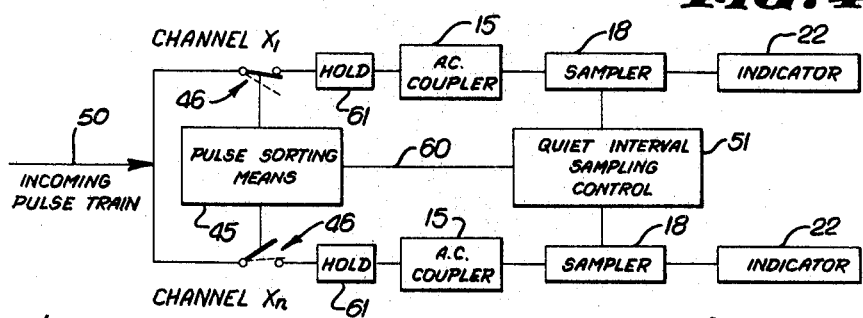
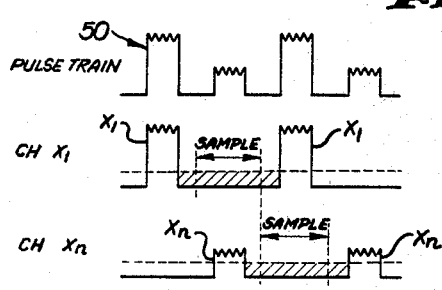
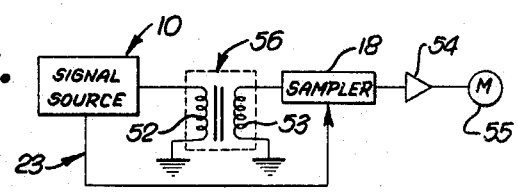
INVENTOR.
JOHN A. HOLLY
BY White & Haefliger
ATTORNEYS.

United States Patent Office 3,502,979
Patented Mar. 24, 1970

3,502,979
QUIET INTERVAL PULSE SAMPLING
John A. Holly, Monrovia, Calif., assignor to Cary Instruments, Monrovia, Calif., a corporation of California
Filed Apr. 26, 1967, Ser. No. 633,826
Int. Cl. G01r 19/00, 19/04; H03k 9/02
U.S. Cl. 324—102                    11 Claims

ABSTRACT OF THE DISCLOSURE

Disclosed pulse-train signal level measurement apparatus operates to produce an effective AC signal zero reference level, and to sample the quiet-interval signal level below the reference level, in order to overcome error due to pulse jitter and noise.

BACKGROUND OF THE INVENTION

This invention relates generally to signal measurement, and more particularly concerns the determination of signal level associated with a pulse train typically characterized by accompanying jitter and noise. The invention has unusually advantageous application to the measurement of electrical signal levels in pulse trains produced by converters responsive to pulsed electromagnetic radiation input, as for example "chopped light" in spectrophotometers; however, the invention has wide application outside the field of photometrics.

Measurement of signal levels in pulse trains presents certain problems where noise and jitter are present. Typically, the pulses may contain a relatively large component of essentially random noise, whereas very little noise may be present in the signal during the intervals between pulses. There may also be slight variations in pulse duration and repetition rates, producing jitter. Such signals are encountered in many applications where relatively noisy signals are switched or chopped in alternation with quiet signals, relative to an arbitrarily displaced DC reference. Typical of such applications are the output of a phototube receiving chopped light in spectroscopy or spectrophotometry apparatus; thus, the high-noise pulse occurs when light strikes the phototube, whereas, the low-noise quiet intervals correspond to the "dark current" of the phototube. It then becomes important to obtain a highly accurate measure of the signal separation $V_1$ between the average signal levels during the pulse and quiet intervals.

One prior method for obtaining the measurement $V_1$ involves passing the pulse train through a DC filter. If the displacement $V_2$ of the quiet interval level from the DC zero level is large relative to the required accuracy of the measuring system, the result will be unsatisfactory, as the DC output of the filter will be in error by the amount $V_2$. Another prior method involves passing the pulse train through a narrow-bandpass AC filter, passing only those signals at frequencies corresponding closely to the repetition rate of the pulses in the train under consideration, the extracted fundamental then being rectified. As vacuum or solid state diodes are generally non-linear, especially for small signals, synchronous rectification is necessary for high accuracy. Such a system operates successfully, but very good frequency stability of both the signal source and the filter is required, necessitating relatively elaborate and expensive instrumentation.

It is also possible to pass the pulse train through an AC coupler circuit operating to refer the output signal to an AC zero reference level, and to synchronously sample the pulse height relative to the reference level. Because of jitter in the signal-source switching or in the synchronous sampler, it is impractical to attempt to sample the pulse height at the beginning of each pulse, or to attempt to cease sampling at the end of each pulse, inasmuch as error would result whenever jitter displaced the pulse in time relative to the sampling interval so as to produce erroneous partial sampling of the quiet interval. It then becomes necessary to sample the pulse over a shorter interval commencing after pulse initiation and ceasing prior to pulse termination, but with the disadvantage of reduced accuracy, especially for shorter pulses, resulting from the shorter available time for averaging or "integrating out" the noise. The problem is further aggravated where the pulse is not rectangular, but has trapezoidal, sinusoidal or other shape.

SUMMARY OF THE INVENTION

The present invention has as its major object the provision of simple, effective means to overcome the above problems. Basically, an AC coupler circuit is provided to be responsive to the pulse train to produce output L of one polarity during certain time intervals of pulse transmission and of "opposite" polarity during other time intervals between said certain time intervals, L being a function of time, and the integral $$\int_0^{\Delta T} L\,dt$$

being approximately equal to zero, where the period $\Delta T$ is defined by the reciprocal of the pulse repetition rate; also, signal level sampling means is operatively connected to sample the output L when it has said opposite polarity and over a substantial portion of the quiet interval between successive pulses. The phrase "approximately" equal "to zero" above is intended to connote that the average departure from zero over several cycles must be negligible relative to the desired measurement accuracy. Thus, sampling is carried out during the time when there is apparent absence of signal pulses; however, validity of such sampling can be established in view of later discussion in the specification.

Additional features and objects of the invention include the provision of a coupler circuit in the form of an RC network having a time constant that is at least several times larger than the reciprocal of the pulse repetition rate; the provision of a coupler circuit comprising a capacitor connected in series between the signal source and the sampling means, and resistance electrically connected in shunt with respect to the connection between the capacitor and the sampling means; the provision of sampling apparatus in the form of a field effect transistor with source and drain terminals connected in series with the coupler capacitor, together with means to supply turn-on voltage to the FET control terminal during sampling intervals; the provision of pulse train source in the form of a converter responsive to pulsed electromagnetic radiation (as for example chopped light) input to produce an electrical signal pulse train; the provision of the basic coupler and sampler in each of $X_1$ to $X_n$ channels, together with pulse-sorting sample and hold means operable to sort $X_1$ pulses from the train for transmission to the AC coupler associated with channel $X_1$ . . . and to sort $X_n$ pulses from the train for transmission to the AC coupler associated with channel $X_n$, and control means operating the channel $X_1$ . . . $X_n$ signal level sampling means in a certain advantageous timed relation to be described. It should be recognized that large values of $n$ result in diminished system output.

These and other objects and advantages of the invention, as well as the details of illustrative embodiments,

BRIEF DESCRIPTION OF THE DRAWINGS

FIG. 1 is a block diagram showing a system incorporating the invention;

FIG. 2 is a circuit illustrating one preferred embodiment of the invention;

FIG. 3 is a waveform illustrating the sampling principle of the invention;

FIG. 4 is a block diagram illustrating a multiple channel system embodying the invention;

FIG. 5 illustrates waveforms associated with the FIG. 4 system; and

FIG. 6 illustrates a modified form of the invention.

DESCRIPTION OF CERTAIN PREFERRED EMBODIMENTS

Referring first to FIGS. 1 and 3, the signal source 10 may be considered as productive of a pulse train 11 wherein the pulses of duration $\Delta T_1$ have relatively high-noise content signal levels 12, and wherein the pulses are separated by low-noise intervals $\Delta T_2$ characterized by low-noise signal level 13. In this regard, $$\Delta T_2 = \frac{1}{f_0} - \Delta T_1 \tag{1}$$

where $f_0$ defines the pulse repetition rate. As previously stated, jitter may be present, whereby $\Delta T_2$, $\Delta T_1$ and $f_0$ may vary slightly.

The FIG. 3 pulse train 11 is transmitted at 14 for passage through the AC coupler 15, the latter being responsive to produce an output L of one polartiy $L_1$ associated with time intervals $\Delta T_1$ of pulse transmission, and of opposite polarity $L_2$ associated with other time intervals $\Delta T_2$ between the intervals $\Delta T_1$. The AC coupling means has a time constant that is large compared with $1/f_0$, i.e. it has very low frequency response, whereby the outputs $L_1$ and $L_2$ are referred to an AC zero reference level 16 seen in FIG. 3, and which is in effect developed by the AC coupler 15. If the time constant is too short the amplitude of the system output will be degraded, resulting in a loss in signal-to-noise ratio (if there is any noise during such other intervals $\Delta T_2$). However, the time constant must not be overlong, or the system output will not faithfully reflect dynamic changes in the input. The range of time constants usable in a particular application will be calculable by one skilled in the art, in view of these considerations, and will usually be found to be at least several times the reciprocal of the pulse-repetition rate. Considering that L is a function of time, the AC zero reference level 16 is further characterized in that, when the heights of successive pulses are substantially equal, $$\int_0^{1/f_0} L\,dt \simeq 0 \tag{2}$$

In the case where the pulse train has approximately square wave shape as in FIG. 3.

$$\int_0^{1/f_0} L\,dt = \int_{t_n}^{t_{n+1}} L_1\,dt - \int_{t_{n+1}}^{t_{n+2}} L_2\,dt$$
$$= \Delta T_1 \cdot L_1 - \Delta T_2 \cdot L_2 \simeq 0 \tag{3}$$

Here the value zero (0) is as defined earlier. The output from the coupler 15 is transmitted at 17 to sampler 18 indicated as a switch having an arm 19 movable into and out of engagement with contact 20, the latter being connected at 21 with a suitable indicator 22. Movement of arm 19 is controlled at 23 in synchronism with the pulse repetition rate $f_0$ so as to sample the coupler output $L_2$, of polarity opposite that of output $L_1$, over a substantial portion of the quiet intervals $\Delta T_2$ between successive pulses. Thus, the sampling may extend over the intervals $\Delta T_2 - 2\epsilon$, commencing at $t_{n+1} + \epsilon$ and terminating at $t_{n+2} - \epsilon$ as indicated in FIG. 3, where $\epsilon$ is only large enough to assure lack of overlap of the sampling interval with the pulse duration $\Delta T_1$, the latter being subject to slight time shifting due to jitter as mentioned previously.

Advantages of such sampling during the "absence" of signal interval $\Delta T_2$ are considerable as distinguished from sampling during the interval $\Delta T_1$. First, the low noise level 13 is sampled to produce much greater accuracy (high signal to noise ratio) than possible where the high noise level 12 is sampled. Also, the length of the interval $\Delta T_2$ is in many if not most cases longer than the pulse duration interval $\Delta T_1$, enabling greater accuracy due to longer sampling, especially where the pulse timing is so non-reproducible as to require marked reduction of the $L_1$ sampling interval below $\Delta T_1$ in order not to overlap with $\Delta T_2$. The latter advantage may otherwise be characterized as embodying freedom from train shape, freedom from pulse width and freedom from pulse shift (jitter). Additionally, in some instances quiet-interval sampling produces lower output ripple. The output may be usable in unfiltered form, or readily filtered, as convenient for process-control mechanisms, signal display, or other utilization purposes.

Sampler 18 should preferably introduce no DC biases into the portion of the signal which it transmits, nor back into the coupler, as this would introduce error, necessitating additional provision for compensating for such biases.

In the more detailed example seen in FIG. 2 the signal source comprises a converter including a phototube 30 receiving chopped electromagnetic radiation such as light from the chopper 31. The phototube output consists of an electrical signal pulse train which is amplified at 32 for transmission to the AC coupler. The latter is illustrated as including an RC network comprising capacitance 33 electrically connected in series between the signal source and the sampler 18, and resistance 34 electrically connected in shunt with respect to the connection 35 of the capacitor with the sampler. Typically, the resistance 34 is large valued as compared to the reactance $$\frac{1}{2\pi f_0 C}$$

where C is the value of the capacitance 33 and $f_0$ is the pulse repetition rate, for large time constant production. However as shown in FIG. 6, the coupler may equally well be a transformer 56 of suitable characteristics, having its primary coil 52 connected across the signal source 10 output and its secondary coil 53 across the sampler 18 input.

Again referring to FIG. 2, the sampler 18 is illustrated to comprise a field effect transistor 36 having source and drain terminals 37 connected as shown, and control terminal 38. Means to supply turn-on voltage to the transistor control terminal 38 during quiet interval sampling is indicated generally at 39. The latter has quiet interval synchronization at 40 with the signal source, as for example the chopper 31. Further components seen in FIG. 2 include the ripple removing filter 41, amplifier 42 and utilization means 22, which may for example be an indicator, a control mechanism, or any further system or group of systems responsive to the desired measure of signal pulse level.

Turning now to FIG. 4, the FIG. 1 elements 15, 18 and 22 are supplied in each of "n" channels, as for example are indicated by channel $x_1$ and channel $x_n$. Also shown are pulse-sorting means, including control 45 for channel switches 46, operable to sort $x_1$ pulses (seen in FIG. 5) from the pulse train 50 for transmission to the AC coupler 15 associated with channel $x_1$, . . . and to sort $x_n$ pulses from the train for transmission to the AC coupler 15 associated with channel $x_n$; in each channel the signal from switch 46 being maintained at the input of coupler 15 by hold circuit 61, when switch 46 is open.

FIG. 4 further includes control means 51 controlling operating of the channel $x_1 \ldots x_n$ signal level samplers 18 to sample the output $L_2$ in channel $x_1$ during transmission of $x_n$ pulses to the channel $x_n$ coupler 15, and to sample the output $L_2$ in channel $x_n$ during transmission of $x_1$ pulses to the channel $x_1$ coupler, as is clear from channel $x_1$ and $x_n$ waveforms in FIG. 5. Note that control 45 controls switch 46 in channel $x_1$ to transmit the pulse train when switch 46 in channel $x_n$ is open to block the train, and vice versa. Advantages include the introduction of the benefits of quiet interval sampling to a time division multiplexed system. Synchronization of controls 45 and 51 is indicated at 60.

FIG. 6 illustrates use of the unfiltered output of sampler 18, after amplification at 54, to drive a motor 55, which may be the motor of a mechanical indicating device such as a recorder, or which may be a motor used to control some physical parameter being measured by the quiet-interval sampling system, or which may be utilized in other ways including visual or other display.

It must be emphasized that this invention applies to measurement of the amplitude or energy content of pulses of irregular shape, though such are not illustrated; and further that this invention applies to non-electronic signals, as for example those found in fluidic systems.

I claim:
1. In apparatus for obtaining measurement of signal level associated with a pulse train, the improvement combination comprising:
   coupler means responsive to the pulse train to produce output L of one polarity during certain time intervals corresponding substantially to pulse transmission, and of opposite polarity during other time intervals, corresponding substantially to the absence of pulse transmission, between said certain time intervals; L being a function of time $t$ and

$$\int_0^{1/f_0} L\,dt \simeq 0$$

where $f_0$ is the nominal pulse-repetition rate; and signal-level sampling means operatively connected to sample said output of opposite polarity over a portion of each of said other intervals.

2. The apparatus of claim 1 wherein the coupler means comprises an RC network having a time constant that is at least several times larger than the reciprocal of the pulse repetition rate.

3. The apparatus of claim 2 including a pulse train source, wherein said coupler means comprises capacitance electrically connected in series between said source and said sampling means, and resistance electrically connected in shunt with respect to the connection between the capacitance and said sampling means.

4. The apparatus as defined in claim 1, in which the sampling means comprises an electrical-switching device electrically connected with said coupler means, and means to operate said switching device to transmit said output of opposite polarity during said other time intervals.

5. The apparatus as defined in claim 4 including signal indicator means, and a filter electrically connected between said switching device and said indicator means to reduce ripple in the signal transmitted to the indicator means.

6. The apparatus as defined in claim 1 wherein said pulse train is derived from means comprising an electro-optical converter responsive to pulsed electromagnetic radiation input to produce an electrical signal pulse train.

7. The apparatus as defined in claim 6 wherein said converter comprises a photosensitive device.

8. Apparatus as defined in claim 1 in each of $x_1 \ldots x_n$ channels, and pulse-sorting means operable to sort $x_1$ pulses from the train for transmission to an AC coupler associated with channel $x_1 \ldots$ and to short $x_n$ pulses from the train for transmission to an AC coupler associated with channel $x_n$.

9. Apparatus as defined in claim 8 including control means operating the channel $x_1 \ldots x_n$ signal level sampling means to sample said output of opposite polarity in channel $x_1$ during transmission of $x_2 \ldots x_n$ pulses to the channel $x_2 \ldots x_n$ couplers, and to sample said output of opposite polarity in channel $x_n$ during transmission of $x_1 \ldots x_{n-1}$ pulses to the channel $x_1 \ldots x_{n-1}$ couplers.

10. Apparatus as defined in claim 1 wherein said coupler means comprises a transformer having a first coil operatively connected to receive said pulse train, and a second coil operatively connected to direct said output L to said sampling means.

11. In apparatus for obtaining and utilizing a measure of energy contained in signal pulses, above a substantially constant energy constituting a signal offset, the improvement comprising:
   coupler means, receiving the entire signal composed of said pulses and offset, for establishing a new reference zero level such that the time average of said entire signal measured with respect to said new reference zero level is substantially negligible relative to said measure to be obtained;
   sampling means, receiving said entire signal, for transmitting only parts of said signal which occur primarily during time intervals corresponding to the absence of said pulses; and
   utilization means, receiving that part of said signal which is transmitted by said sampling means, and responsive to said part as measured with respect to said new reference zero level.

References Cited
UNITED STATES PATENTS

| | | | |
|---|---|---|---|
| 2,253,976 | 8/1941 | Guanella | 330—9 |
| 2,619,552 | 11/1952 | Kerns | 330—9 |
| 2,741,668 | 4/1956 | Iffland | 330—9 |
| 2,846,586 | 8/1958 | Jernakoff | 330—9 XR |
| 3,070,786 | 12/1962 | MacIntyre | 330—9 XR |
| 3,159,787 | 12/1964 | Sexton et al. | 324—132 XR |
| 3,183,450 | 5/1965 | Merington | 330—9 |
| 3,359,410 | 12/1967 | Frisby et al. | 330—9 XR |
| 3,366,888 | 1/1968 | Kawashima et al. | 330—9 |

RUDOLPH V. ROLINEC, Primary Examiner

ERNEST F. KARLSEN, Assistant Examiner

U.S. Cl. X.R.
250—207; 329—50, 109